US012759448B2

(12) United States Patent
Fitzpatrick et al.

(10) Patent No.: US 12,759,448 B2
(45) Date of Patent: Oct. 13, 2026

(54) OCCUPANT SUPPORT

(71) Applicant: Faurecia Automotive Seating, LLC, Auburn Hills, MI (US)

(72) Inventors: Robert C. Fitzpatrick, Auburn Hills, MI (US); Jeffery T. Bonk, Chesterfield, MI (US); Cedric Ketels, Auburn Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 437 days.

(21) Appl. No.: 18/398,413

(22) Filed: Dec. 28, 2023

(65) Prior Publication Data

US 2025/0214497 A1 Jul. 3, 2025

(51) Int. Cl.

*B60N 2/68* (2006.01)
*B60N 2/64* (2006.01)
*B60N 2/90* (2018.01)

(52) U.S. Cl.

CPC ................. *B60N 2/68* (2013.01); *B60N 2/64* (2013.01); *B60N 2/90* (2018.02)

(58) Field of Classification Search

CPC .......... B60N 2/02; B60N 2/28; B60N 2/3081; B60N 2/32; B60N 2/68; B60N 2/90

USPC .................................... 296/65.03, 65.01, 69

See application file for complete search history.

(56) References Cited

U.S. PATENT DOCUMENTS

| | | | | |
|---|---|---|---|---|
| 7,063,385 | B2 | 6/2006 | Lee | |
| 9,758,070 | B1 | 9/2017 | Salenbien | |
| 12,539,794 | B2 * | 2/2026 | Nicol | B60N 2/28 |
| 2004/0160080 | A1 * | 8/2004 | Shibata | B60N 2/3029 296/64 |
| 2018/0265010 | A1 * | 9/2018 | Line | B60N 2/22 |
| 2023/0406179 | A1 * | 12/2023 | You | B60N 2/7005 |

FOREIGN PATENT DOCUMENTS

| | | | |
|---|---|---|---|
| EP | 1336531 | A3 | 9/2004 |
| GB | 2448334 | A | 10/2008 |
| KR | 101381576 | B1 | 4/2014 |
| WO | 2008031991 | A3 | 3/2008 |

* cited by examiner

*Primary Examiner* — Jason S Daniels

(74) *Attorney, Agent, or Firm* — Barnes & Thornburg LLP

(57) ABSTRACT

An occupant support for a vehicle includes frame including a bottom frame and back frame, a back support, and a bottom support. In a seating configuration, the back support is coupled to the back frame and the bottom support is coupled to the bottom frame. In a transition configuration, the bottom support is removed from the bottom frame.

20 Claims, 10 Drawing Sheets

OCCUPANT SUPPORT

BACKGROUND

The present disclosure relates to occupant supports, and particularly to rear occupant supports. More particularly, the present disclosure relates to a rear occupant support that is reconfigurable into a number of different configurations.

SUMMARY

According to the present disclosure, a vehicle includes a support frame, a bottom support, and a back support. The support frame includes a bottom frame and a back frame coupled to a base structure. The bottom support includes a bottom base and a bottom cushion coupled to an upper surface of the bottom base.

In illustrative embodiments, in a seating configuration, the bottom support is coupled to the bottom frame and the support back is coupled to the back frame. The bottom frame extends horizontally outwards from the back frame, and the back frame extends vertically upwards from the bottom frame. The bottom cushion is disposed upwards facing the back support. In a transition configuration, the bottom support is removed from the bottom frame, exposing the bottom frame.

In illustrative embodiments, the bottom frame includes a first portion and a second portion configured to nest within the first portion. In an extended configuration, the second portion may be extended from the first portion to extend a greater distance from the back frame that the bottom frame extends from the back frame in the seating configuration.

In illustrative embodiments, the bottom cushion is removed from the bottom base in a base configuration, exposing an upper surface of the bottom base. The bottom base is attached to the bottom frame such that the upper surface of the bottom base faces the support back.

In illustrative embodiments, the bottom support may be flipped or turned over and coupled to the bottom frame in a flipped configuration. A bottom surface of the bottom support is disposed upwards facing the back support.

In illustrative embodiments, in a second transition configuration, the back support is removed from the back frame. In the second transition configuration, both the back frame and bottom frame are exposed.

In illustrative embodiments, in a stadium configuration, the bottom frame is rotated up into a vertical position parallel with the back support. The bottom frame is disposed in front of the back frame. In a second stadium configuration, the bottom frame is disposed behind the back frame, between the back frame and a base structure or rear wall of the vehicle.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 1:
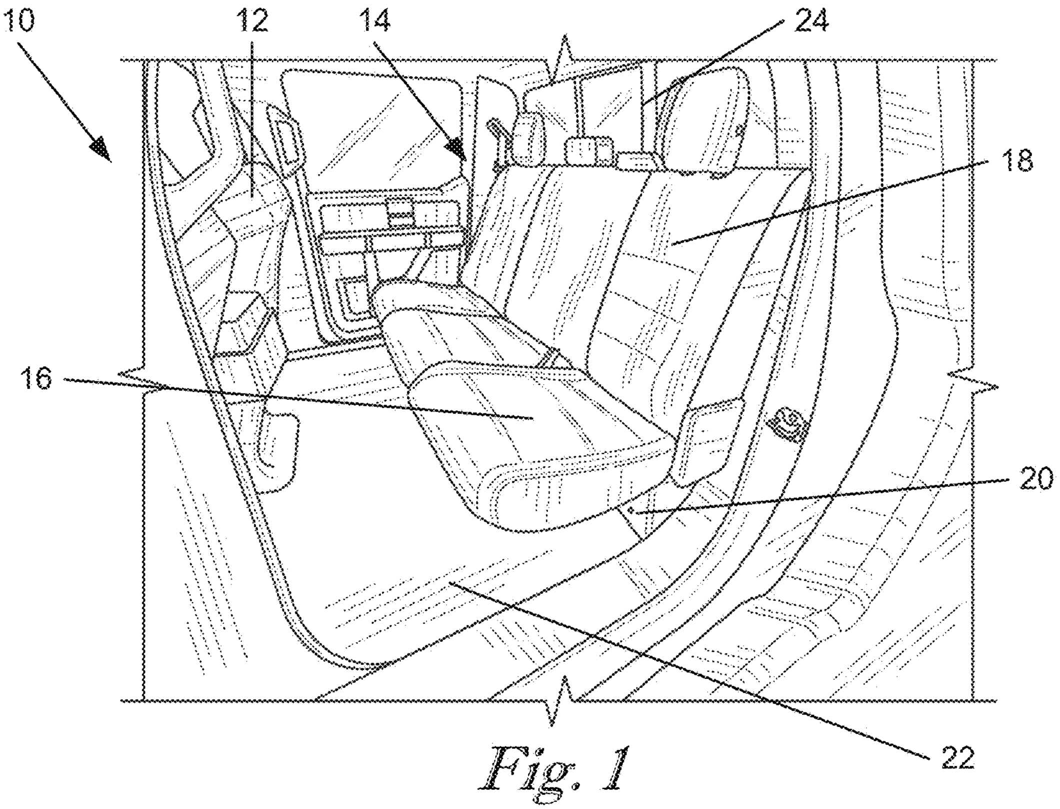
FIG. 1 is a view of a portion of a vehicle that includes a base structure including a rear wall and a floor, a front occupant support, and a rear occupant support including a bottom support and a back support that cooperate to provide a seating space for an occupant when the rear occupant support is in a seating configuration.
Figure 3:
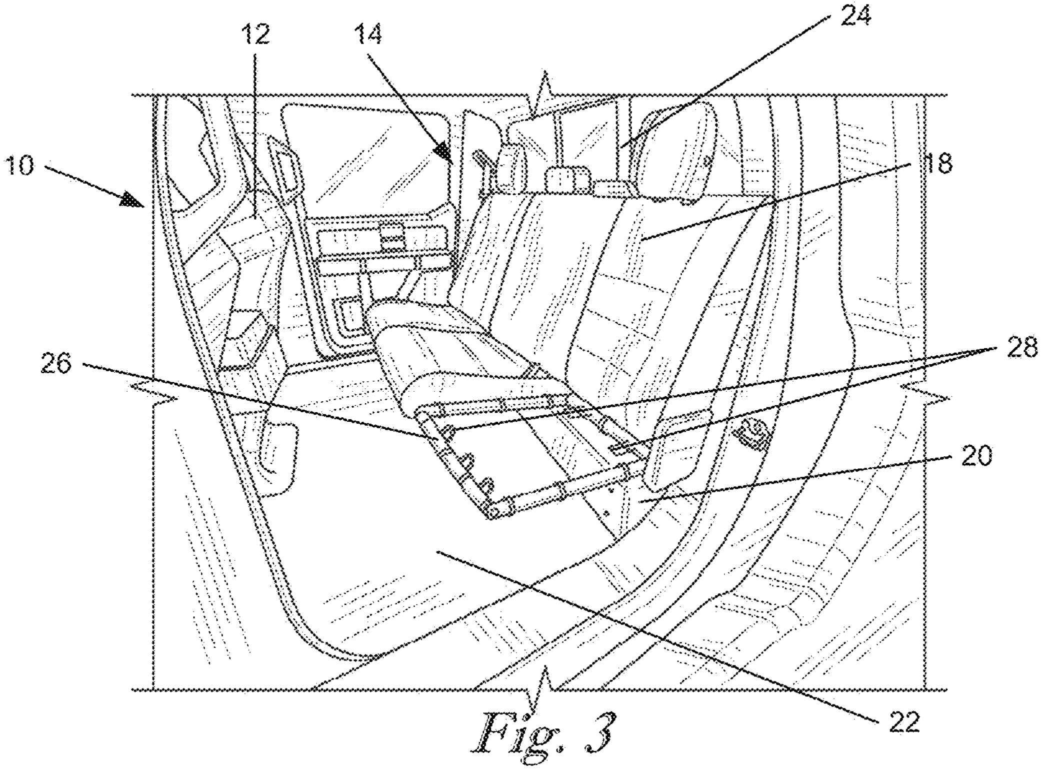
FIG. 3 is a view of a portion of the vehicle of FIG. 1 showing the rear occupant support in the transition mode with the bottom support fully removed and the bottom frame folded down in a horizontal position parallel with the floor.
Figure 9:
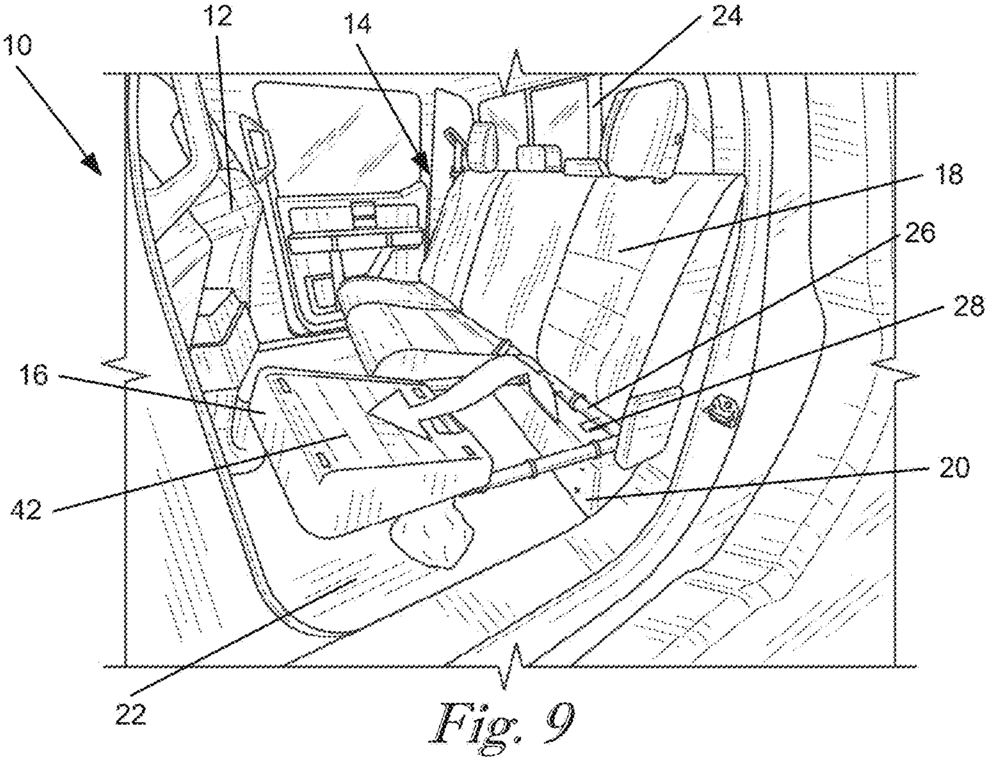
Figure 10:
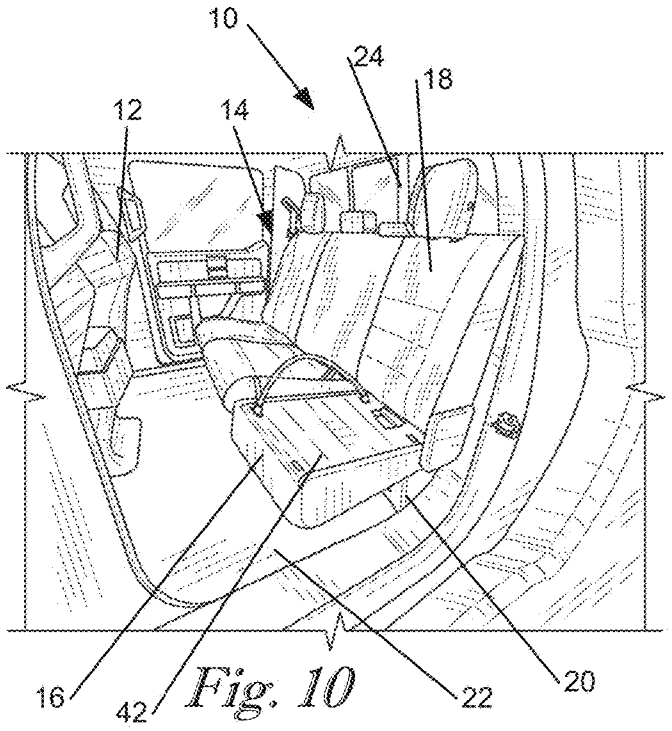
Figure 11:
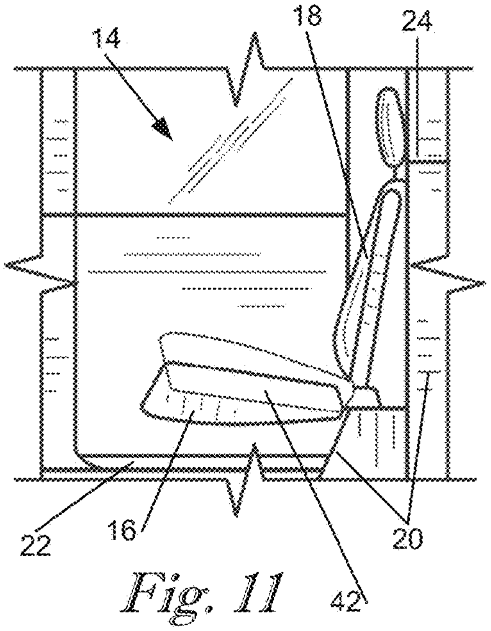
Figure 12:
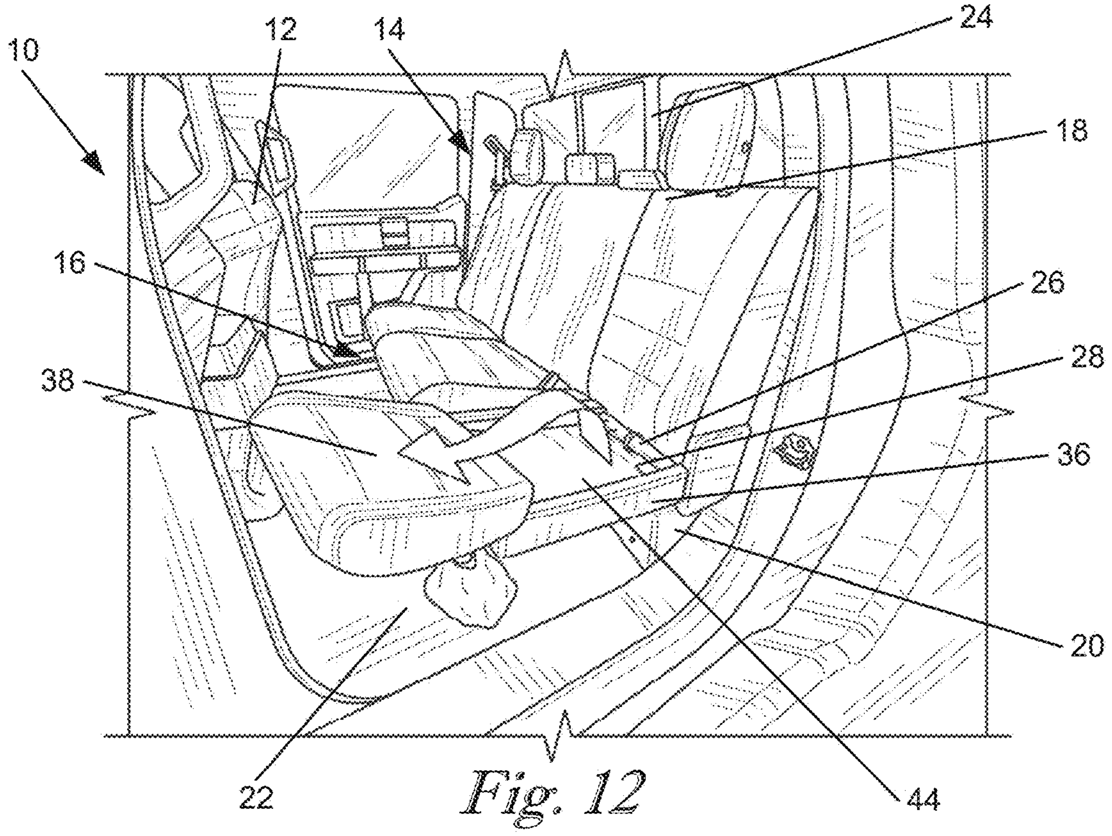
Figure 13:
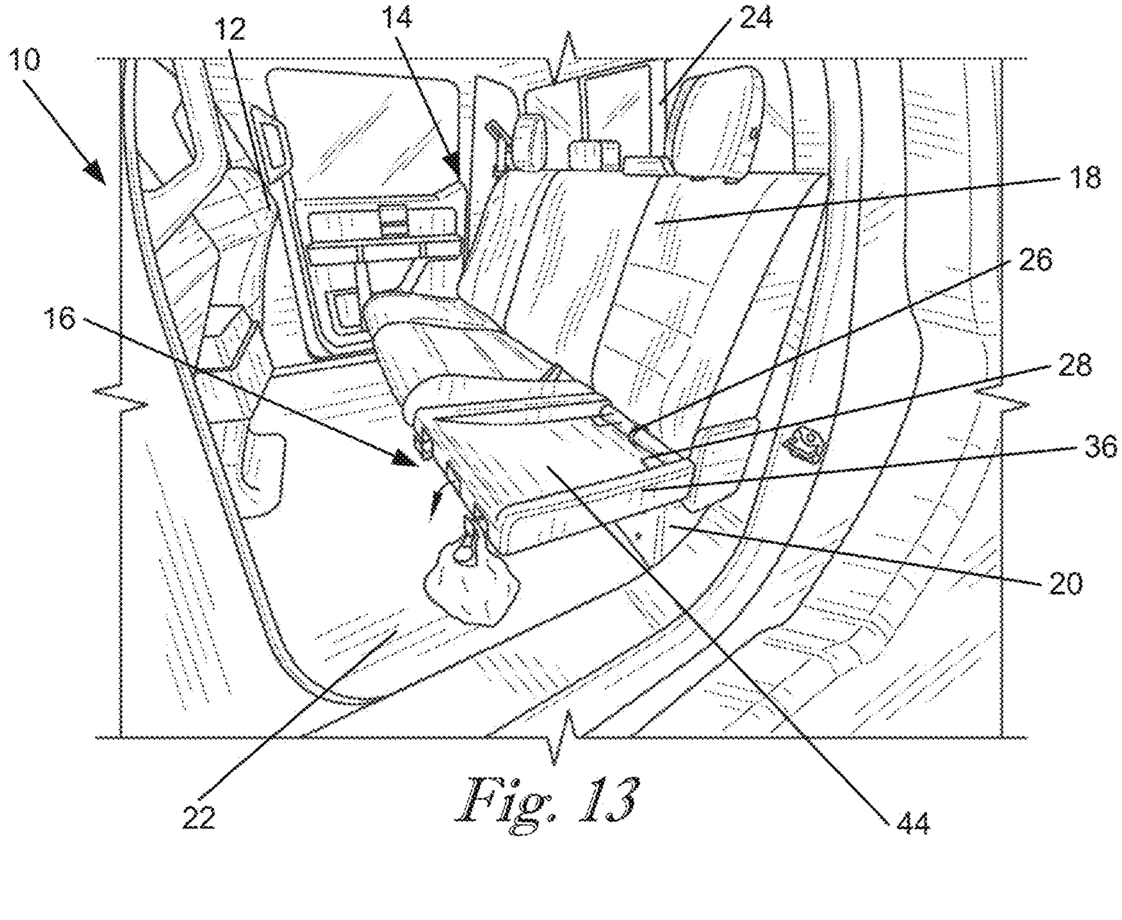
Figure 14:
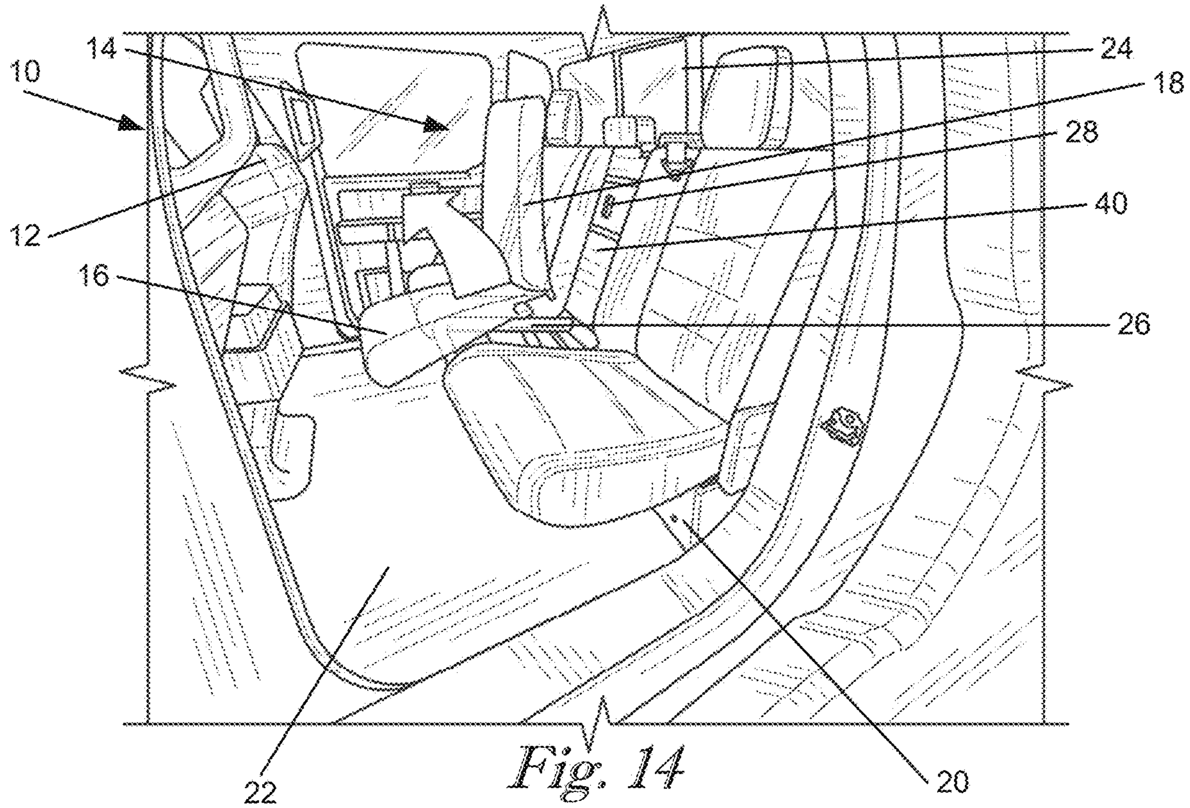
Figure 15:
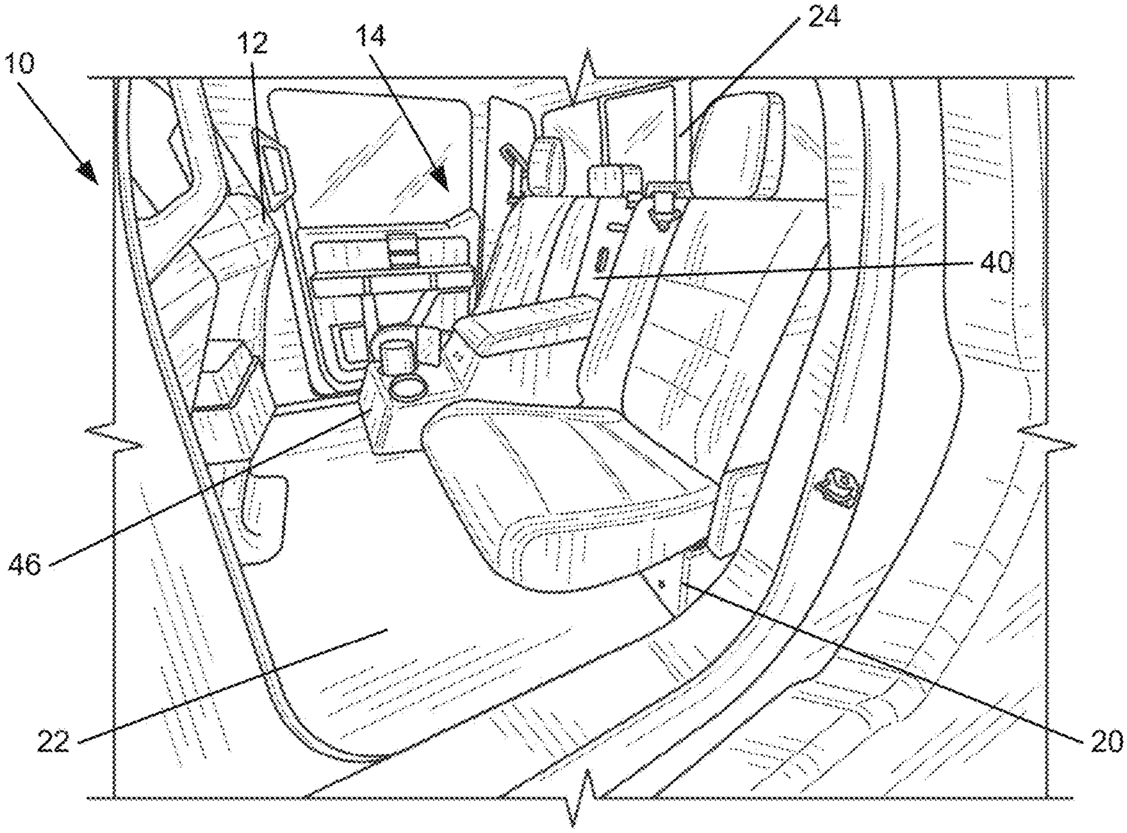
Figure 16:
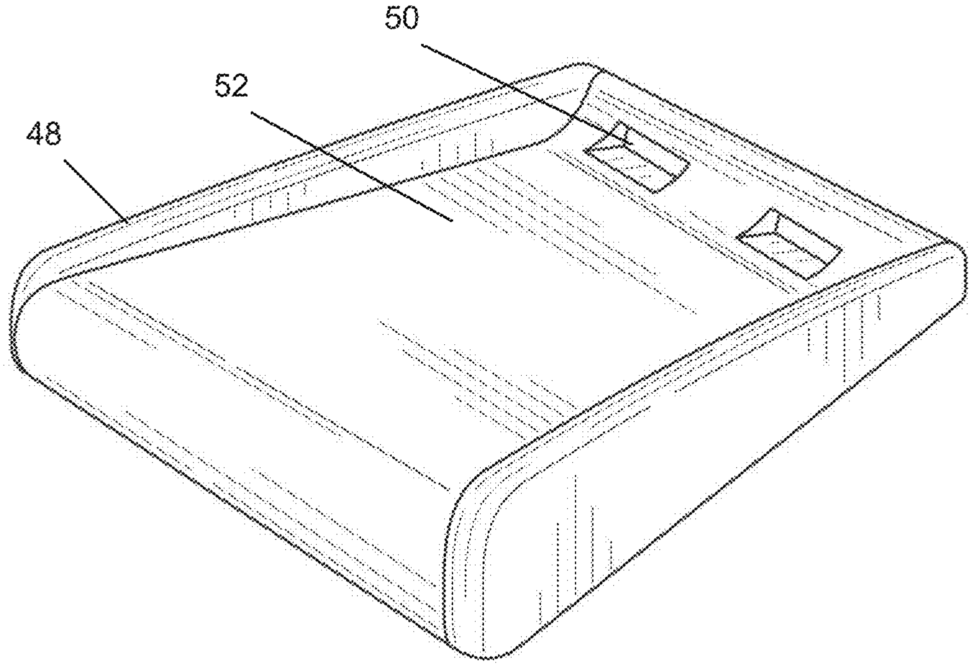
Figure 17:
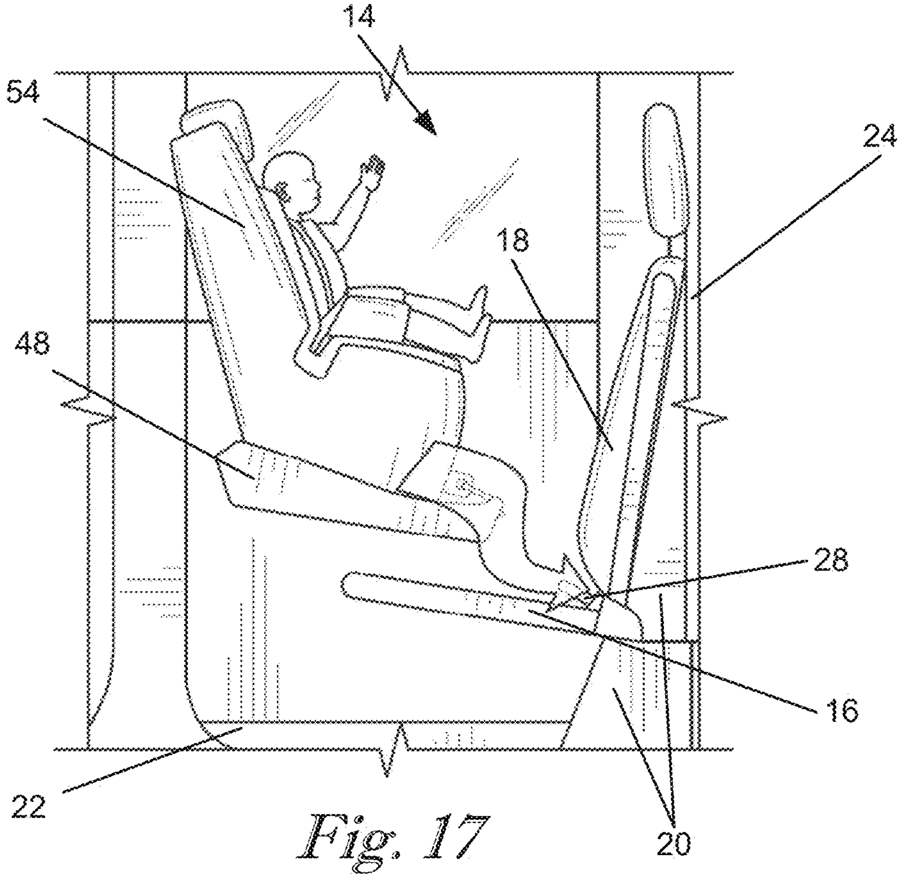
Figure 18:
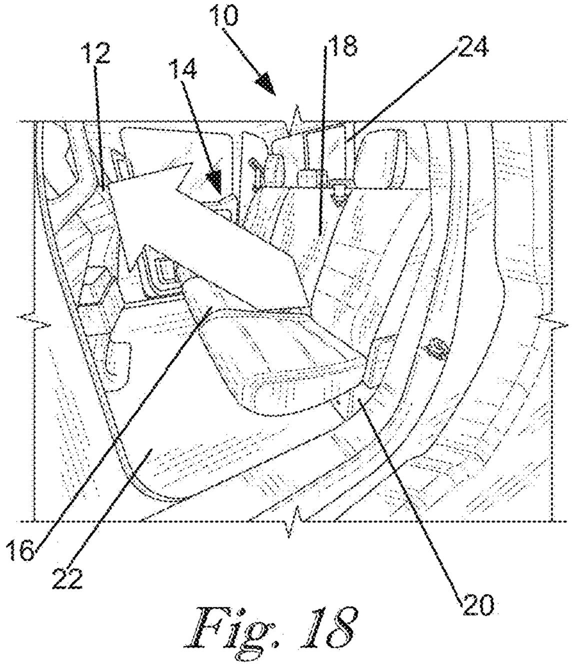
Figure 19:
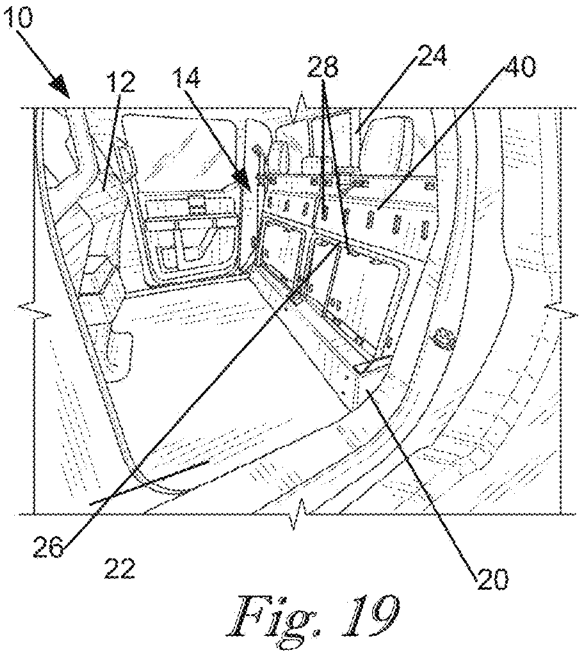
Figure 20:
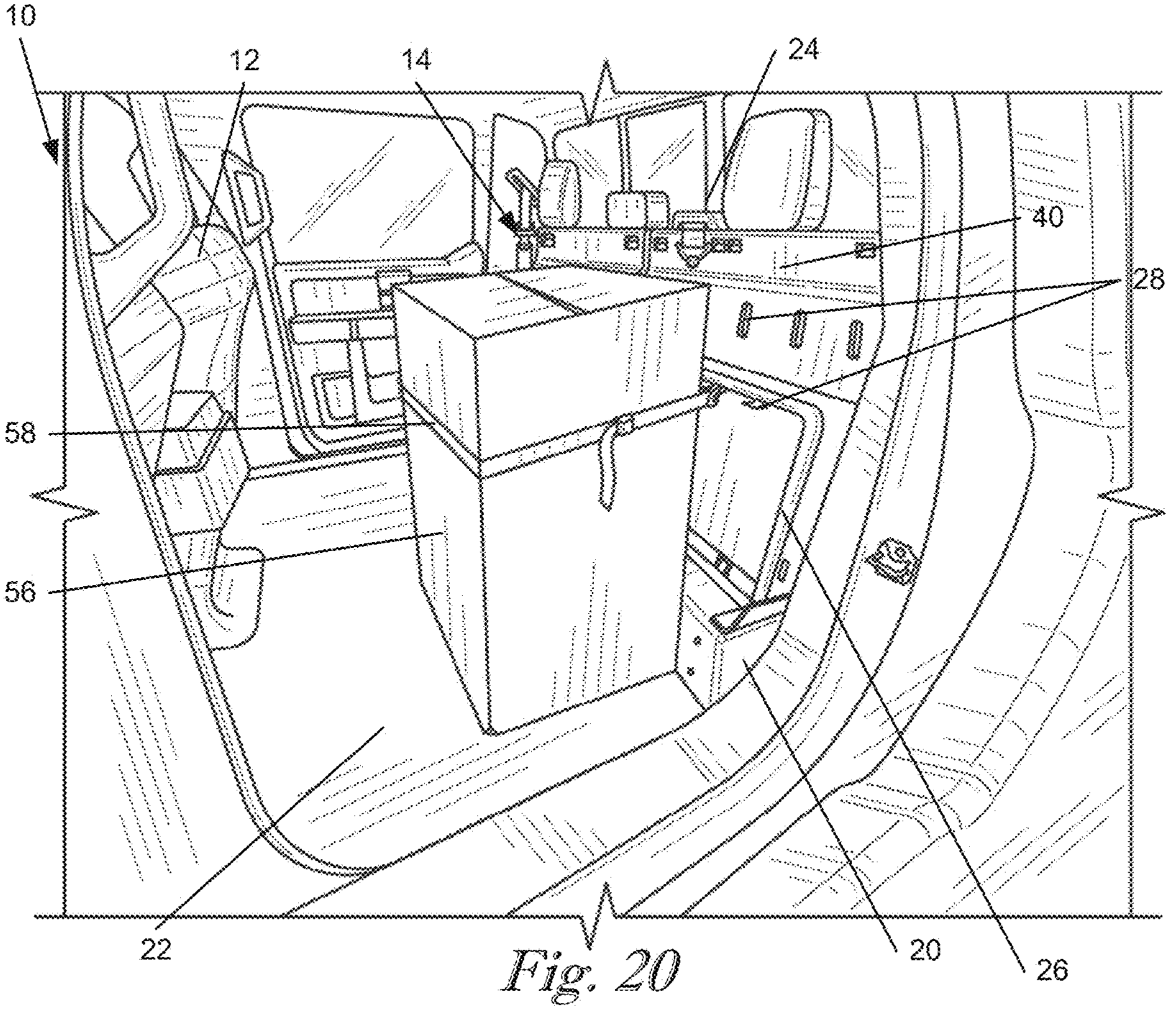
Figure 21:
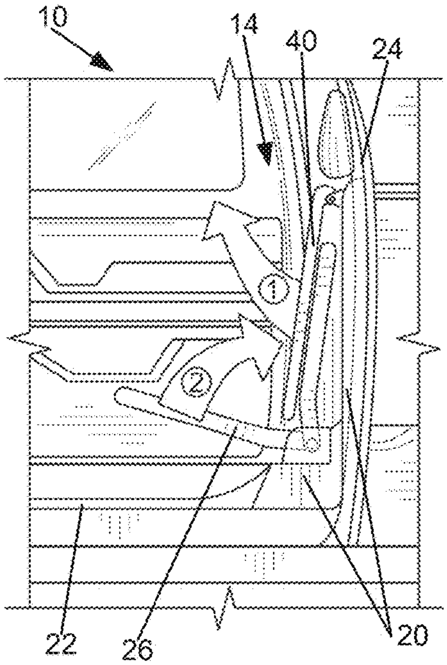
Figure 22:
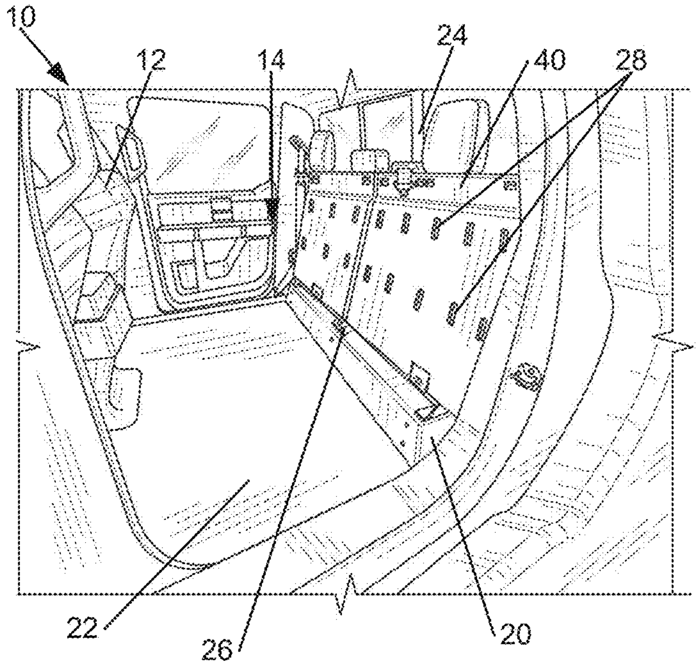
Figure 23:
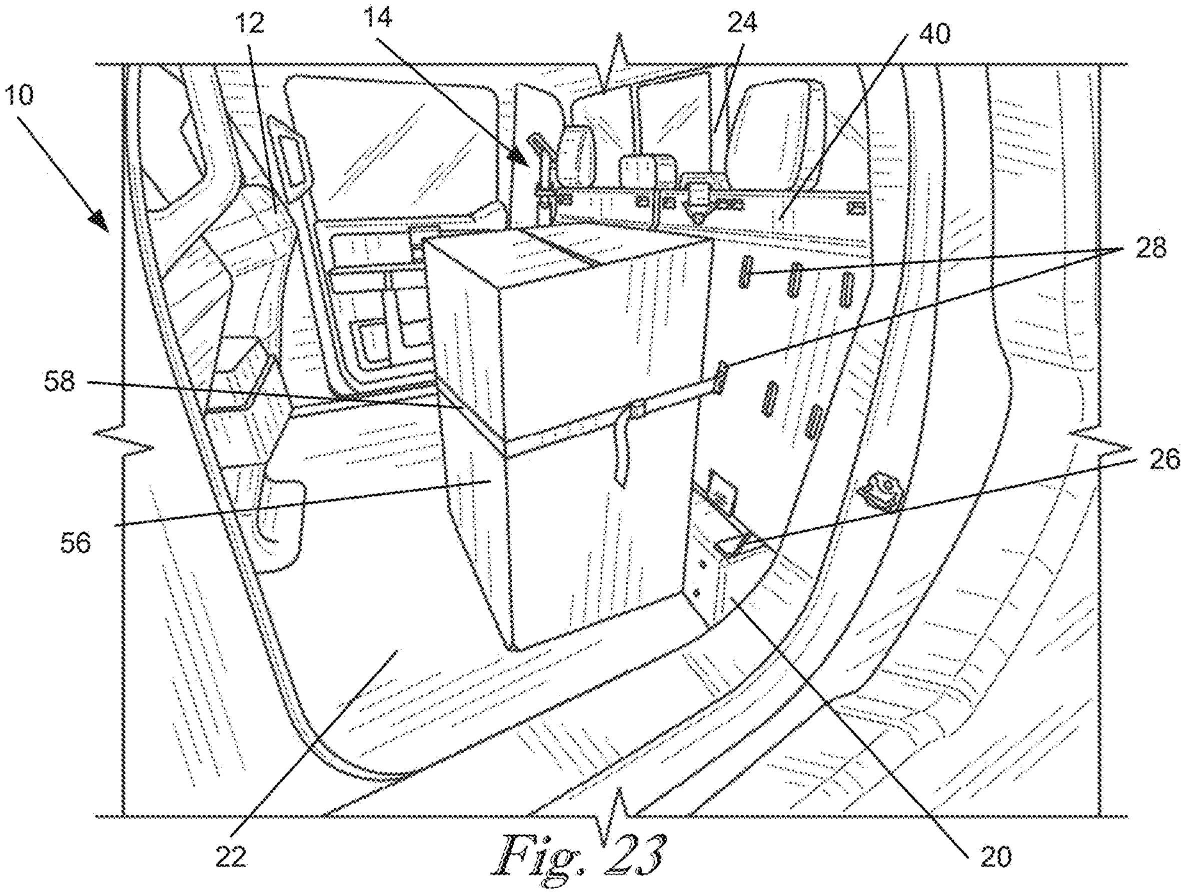

FIG. 9 is a view of a portion of the vehicle shown in FIG. 1 showing the rear occupant support as it is being transition to a flipped configuration where the bottom support is flipped over and coupled to the bottom frame, and showing that the bottom support includes a hard durable surface on a bottom surface of the bottom base, which faces upwards toward the back support in the flipped configuration;

FIG. 10 is a view of a portion of the vehicle shown in FIG. 9 showing the bottom support is flipped over and coupled back on to the bottom frame;

FIG. 11 is a side view of a portion of the vehicle shown in FIG. 10 showing the bottom support flipped over with the bottom surface of the bottom base facing upwards towards the back support;

FIG. 12 is a view of a portion of the vehicle shown in FIG. 1 showing the rear occupant support as it is being transition to a base configuration where the bottom cushion is removed from the bottom base, leaving the bottom base coupled to the bottom frame, and showing that the bottom base includes a hard durable surface on an upper surface of the bottom base, which faces upwards toward the back support in the base configuration;

FIG. 13 is a view of a portion of the vehicle shown in FIG. 12 showing the bottom cushion completely removed from the bottom base;

FIG. 14 is a view of a portion of the vehicle shown in FIG. 1 showing the rear occupant support in a second transition configuration showing that the rear occupant support includes a back frame including anchors, which is coupled to the back support in the seating configuration, but which is exposed by in the second transition position where the back support and the bottom support are removed from the back frame and the bottom frame, respectively;

FIG. 15 is a view of a portion of the vehicle shown in FIG. 14 showing the rear occupant support includes module accessory or module in an accessory configuration, which is coupled to the support frame;

FIG. 16 is a view of a portion of a car seat base configured to be installed onto the support frame of the vehicle shown in FIG. 3, the seat base including openings leaving the anchors on the support frame accessible for a car seat installation;

FIG. 17 is a view of a portion of the vehicle shown in FIG. 3 showing a car seat and the car seat base being installed on the rear occupant support;

FIG. 18 is a view of a portion of the vehicle shown in FIG. 1 showing the rear occupant support being transitioned to a third transition configuration showing all back supports and bottom supports of the rear occupant support being removed from the support frame;

FIG. 19 is a view of a portion of the vehicle shown in FIG. 18 showing the rear occupant support in the third transition configuration with all of the back supports and bottom supports removed from the rear occupant support, leaving only the support frame, and where the bottom frames are all folded upwards in a stadium configuration against the back frame;

FIG. 20 is a view of a portion of the vehicle shown in FIG. 19 showing cargo stored in the rear occupant passenger space and secured with a strap to anchors on the support frame;

FIG. 21 is a side view of a portion of the vehicle shown in FIG. 19 showing the rear occupant support being transitioned to a cargo configuration where the back support is rotated upwards so the bottom frame can be folded upwards and stored underneath the back support;

FIG. 22 is a view of a portion of the vehicle shown in FIG. 21 showing the rear occupant support in the cargo configuration with the bottom frame stored behind the back frame, between the back frame and the rear wall of the vehicle; and FIG. 23 is a view of a portion of the vehicle shown in FIG. 12 showing cargo stored in the rear occupant passenger space in the cargo configuration and secured with a strap to anchors on the back frame.

DETAILED DESCRIPTION

A vehicle 10 in accordance with the present disclosure includes a vehicle 10 frame as shown in FIG. 1 having a front occupant support 12 and a base structure 20 including a floor 22 and a rear wall 24 to define a rear passenger compartment in front of the rear wall 24, rear of the front occupant support 12, and above the floor 22. The front occupant support 12 may be positioned directly aft of a dashboard. The rear occupant support 14 may be positioned directly forward of the rear wall 24 and between the front occupant support 12 and the rear wall 24 within the rear passenger compartment. The rear occupant support 14 includes a bottom support 16, a back support 18, and a support frame including a bottom frame 26 and a back frame 40. The back frame 40 may be coupled to the base structure 20, for example, at the rear wall 24, and the bottom frame 26 may be coupled to the base structure 20 at the floor 22. The bottom support 16 may include a bottom base 36 and a bottom cushion 38. The bottom cushion 38 may be removably coupled to an upper surface 44 of the bottom base 36.

The rear occupant support 14 may be reconfigurable such that the bottom support 16, back support 18, bottom frame 26, and back frame 40 are able to be removed and rearranged into multiple different configurations. For example, FIG. 1 shows the rear occupant support 14 in a seating configuration meant to support an occupant sitting on the back support 18 and bottom support 16. In the seating configuration, the bottom support 16 is coupled to the bottom frame 26 and extends horizontally outwards from the back frame 40 parallel with the floor 22. Additionally, in the seating configuration, the back support 18 is coupled to the back frame 40 and extends vertically upwards from the bottom support 16 with the bottom cushion 38 disposed upwards facing the back support 18.

Figure 2:
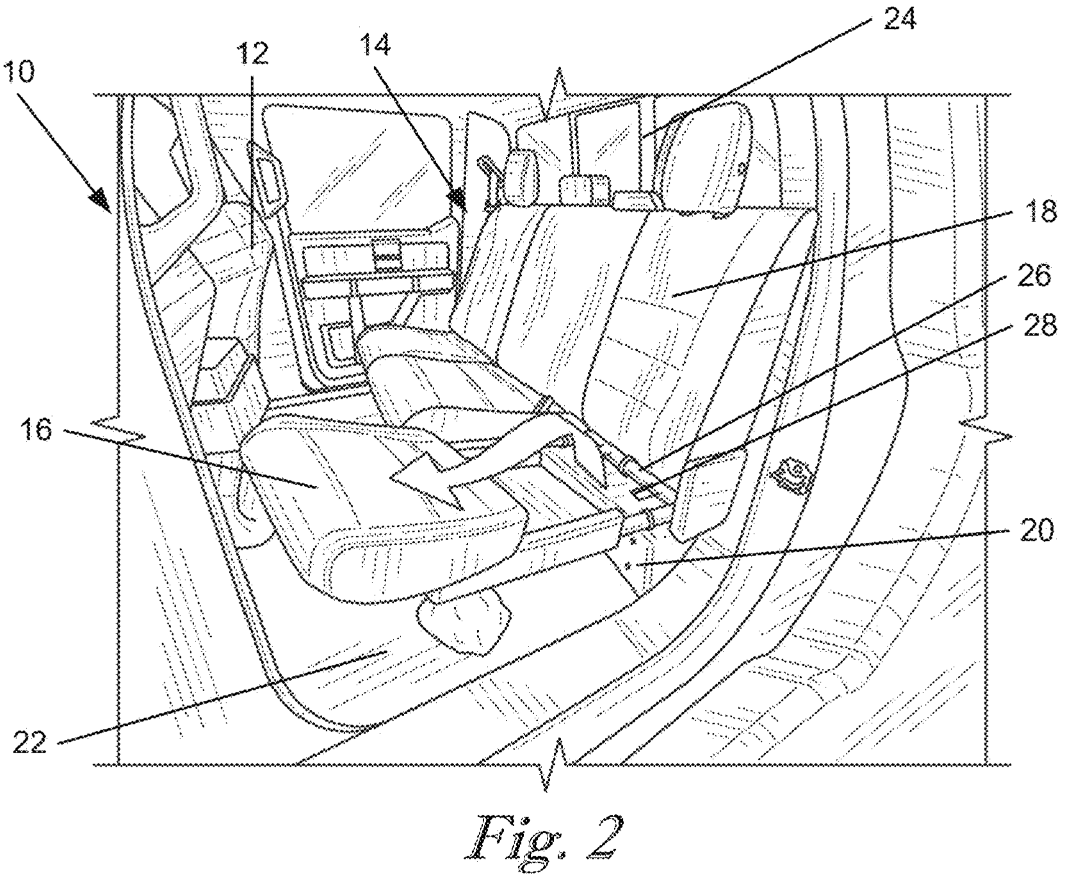
FIG. 2 is a view of a portion of the vehicle shown in FIG. 1 showing the rear occupant support in a transition configuration showing that the rear occupant support includes a bottom frame including anchors, which is coupled to the bottom support in the seating configuration, but which is exposed by in the transition position where the bottom support is removed from the bottom frame.

FIGS. 2-3 show the rear occupant support 14 in a transition configuration. In the transition configuration, the bottom support 16 is removed from the bottom frame 26, exposing the bottom frame 25. The bottom support 16 may be completely removed from the vehicle 10. The rear occupant support 14 may move from the transition configuration to a different configuration, or may stay in the transition configuration.

Figure 4:
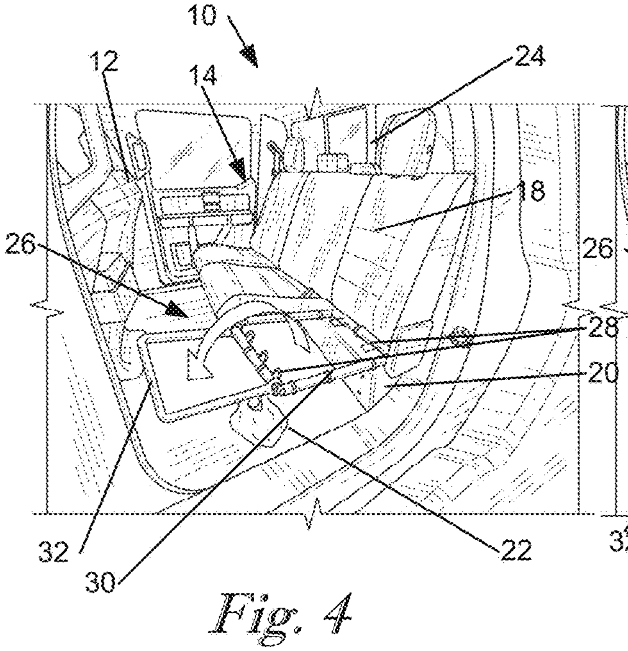
FIG. 4 is a view of a portion of the vehicle of FIG. 3 showing the rear occupant support in an extended configuration and showing that the bottom frame further includes a first portion and a second portion rotatably coupled to the first portion, the second portion rotated to extend past the first portion in the extended configuration.
Figure 5:
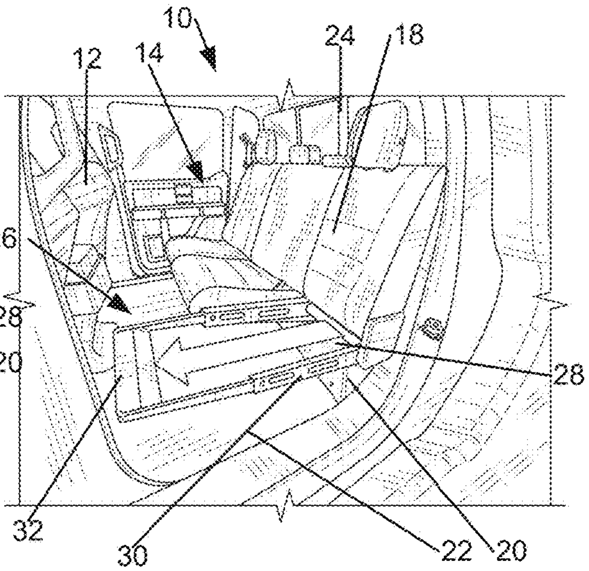
FIG. 5 is a view of a portion of the vehicle of FIG. 3 showing the rear occupant support in another version of the extended configuration in which the second portion slidably coupled to the first portion, the second portion slid out to extend past the first portion in the extended configuration.
Figure 6:
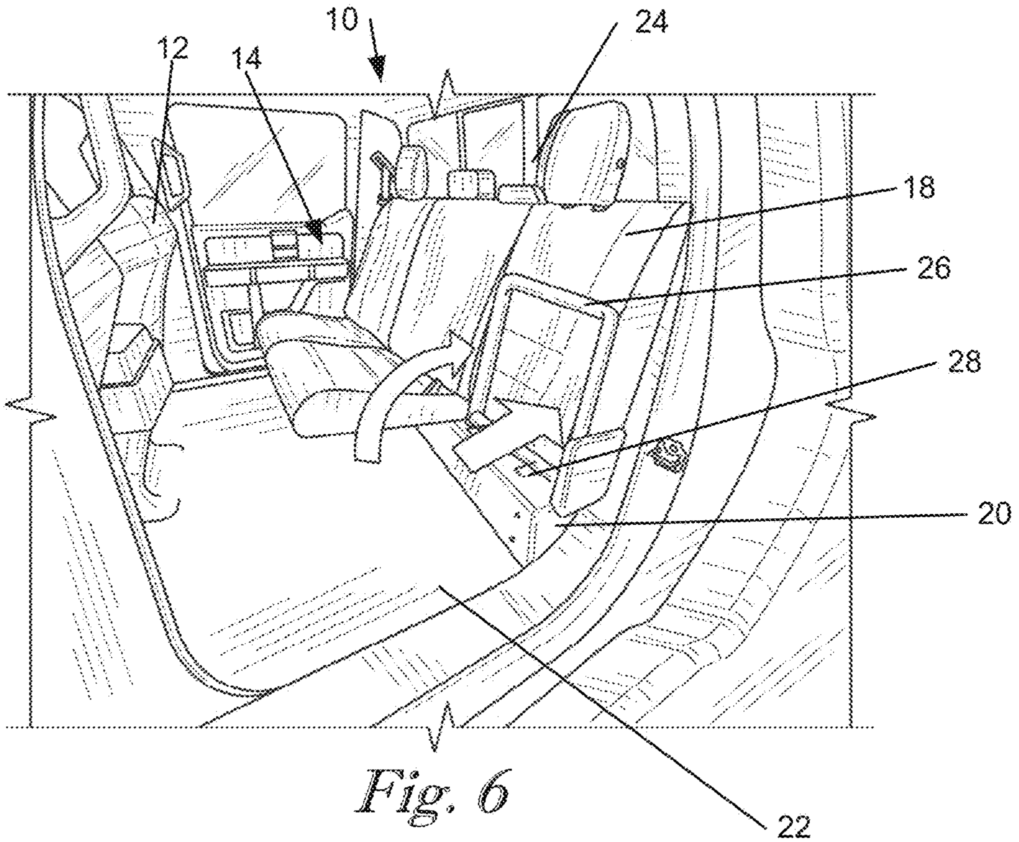
FIG. 6 is a view of a portion of the vehicle of FIG. 1 showing the rear occupant support in the transition mode with the bottom support fully removed and the bottom frame folded up in a vertical position against the back support.

The bottom frame 26 may comprises a rectangular structure as shown in FIGS. 3-5. The bottom frame 26 may be coupled to the base structure 20, for example, the floor 22 or rear wall 24, on one side of the rectangular structure. For example, the bottom frame 26 may be rotatably coupled to the base structure 20 at two pivot points disposed on the corners of the rectangular structure located closet the rear wall 24. The bottom frame 25 may be rotatably with respect to the base structure 20 and the back support 18. The bottom frame 26 may be able to move between a horizontal position (shown in FIG. 3) substantially parallel with the floor 22 and perpendicular with the back support 18, and a vertical position (shown in FIG. 6) substantially parallel with the back support 18 and perpendicular with the floor 22. The bottom frame 26 may be able to be locked in the horizontal position or vertical position such that the bottom frame 26 is not able to rotate or move when locked.

The bottom frame 26 may include a first portion 30 and a second portion 32 as shown in FIGS. 4-5. The second portion 32 may nest or fit within the first portion 30 such that when nested together, the footprint of the bottom frame 26 is equal to the footprint of the first portion 30. The second portion 32 may have a smaller footprint than the first portion 30 and may fit within the perimeter of the first portion 30 when collapsed. The second portion 32 may be rotatably coupled to the first portion 30 on a side of the bottom frame 26 opposite from the side of the bottom frame 26 that is coupled to the base structure 20.

In an extended configuration, the second portion 32 may be rotatable about the first portion 30 such that the second portion 32 can rotate over and in front of the first portion 30. When rotated in front of the first portion 30, the second portion 32 is disposed closer to the front occupant support 12 than the first portion 30 when rotated in front of the first portion 30. In the extended position, a forward most side of the second portion 32 may be closer to the front occupant support 12 and further from the rear wall 24 than a forward most portion of the bottom frame 26 in the seating or transition configuration. Alternatively, the second portion 32 may be configured to slide out of the first portion 30, the sides of the second portion 32 nesting within hollow sides of the first portion 30. In the extended configuration, second portion 32 may be slid out from the first portion 30.

Figure 7:
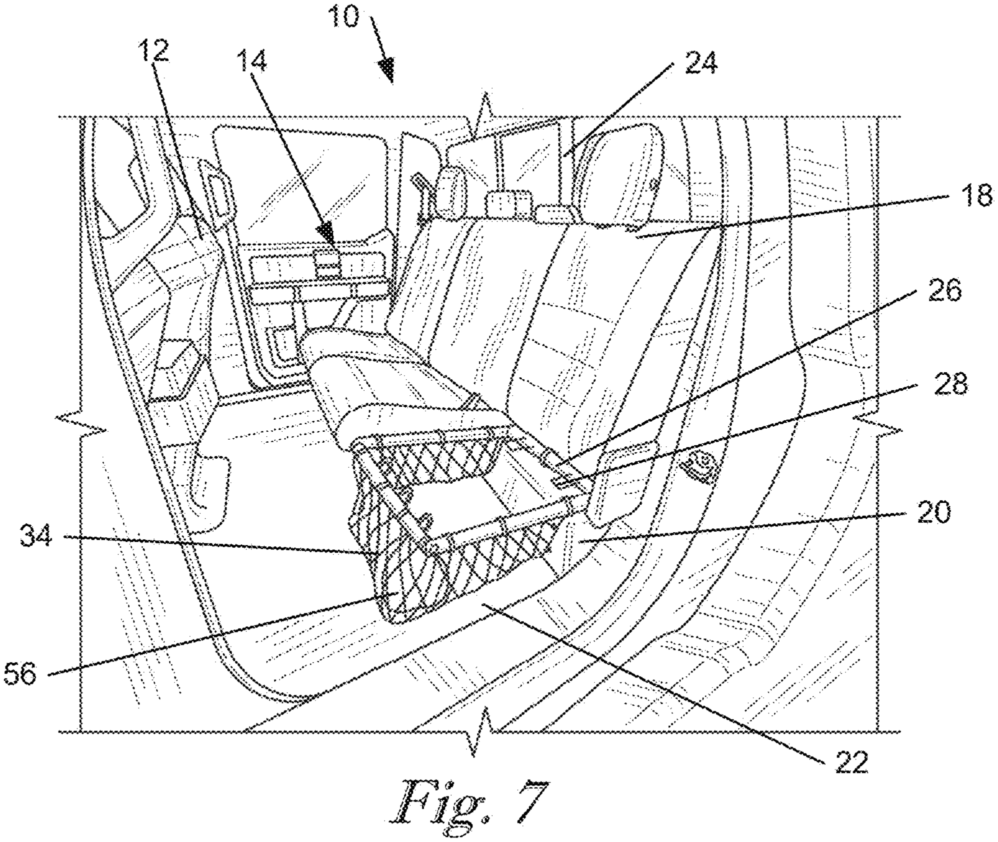
FIG. 7 is a view of a portion of the vehicle of FIG. 2 showing a storage accessory installed on the bottom frame.

The bottom frame 26 and back frame 40 may include one or more anchors 28 as shown in FIGS. 2-6 and 19-23. The anchors 28 may be, for example, hooks, rings, or any other suitable feature able to be used as an attachment or tie-down point for securing cargo 56 or other objects in the vehicle 10. The cargo 56 may be secured to the anchors 28, for example, with straps 58. The anchors 28 may be accessible when the bottom support 16, for example the bottom base 36 or bottom cushion 38, or back support 18 are removed from the frame. The anchors 28 may be accessible when the bottom frame 26 is in either the horizontal or vertical position. The bottom frame 26 may receive a storage accessory 34 able to be coupled to the bottom frame 26. The storage accessory 34 may be any type of device able to help secure cargo 56 or other objects to or within the bottom frame 26. For example, the storage accessory 34 may be a net bag as shown in FIG. 7.

Figure 8:
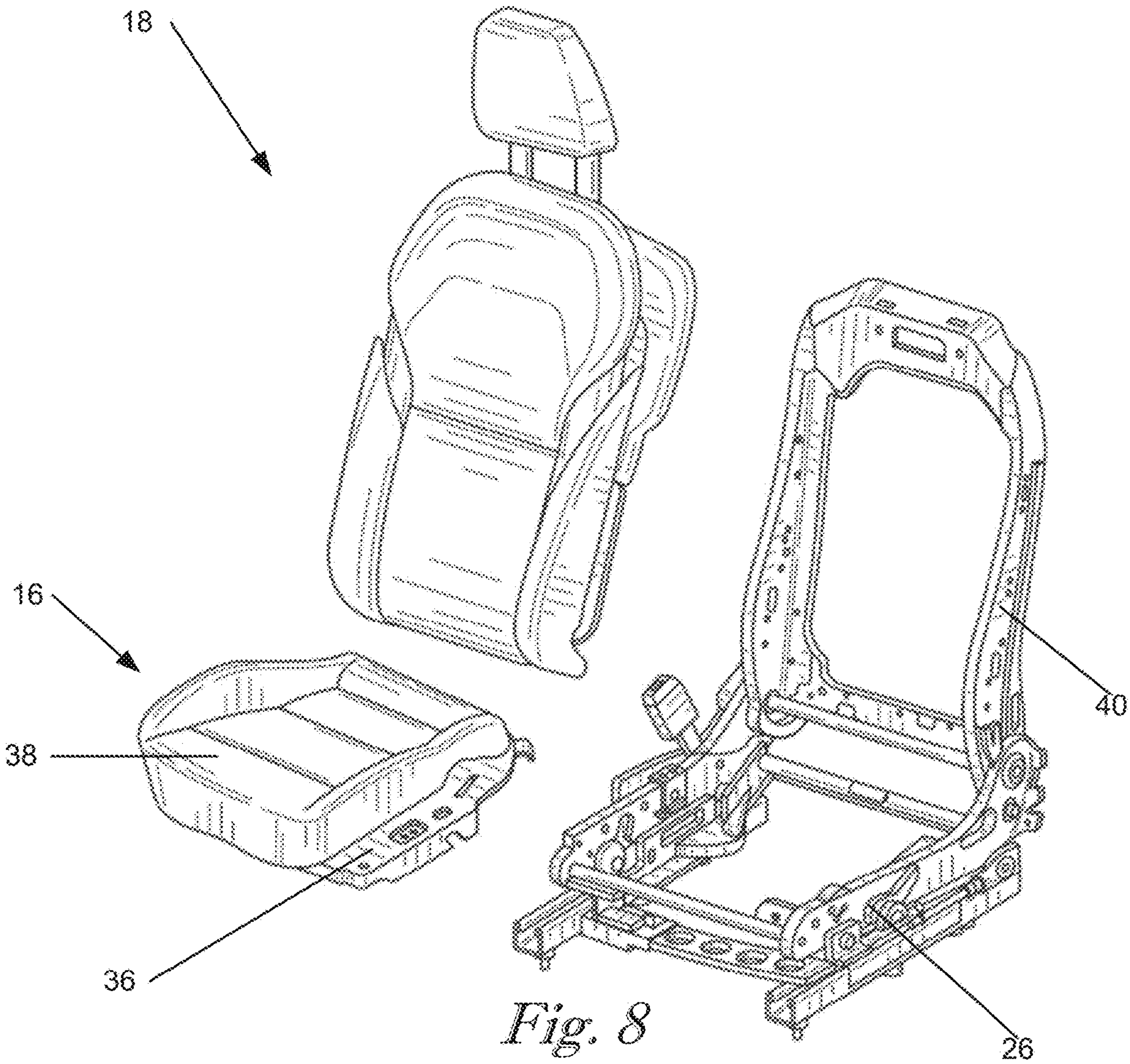
FIG. 8 is an exploded view of a portion of the rear occupant support of the vehicle of FIG. 1 showing the rear occupant support includes the back support, the bottom support including the bottom base and bottom cushion, and the support frame including the bottom frame and the back frame.

The bottom support 16 may include both the bottom cushion 38 and the bottom base 36 as shown in FIG. 8. The bottom cushion 38 may be removably coupled to the bottom base 36. As shown in FIGS. 12-13, in a bottom base configuration, the bottom cushion 38 may be removed from the bottom base 36 with the bottom base 36 remaining coupled to the bottom frame 26 with the upper surface 44 of the bottom base 36 facing the support back. At least a portion of the upper surface 44 of the bottom base 36 may be a hard, durable surface capable of withstanding heavy objects being placed, stored, or pushed into the upper surface 44 without causing damage or deformation of the upper surface 44. The upper surface 44 may be, for example, a hard plastic material.

In a flipped configuration, shown in FIG. 9-11, the bottom support 16 may be installed onto the bottom frame 26 with the bottom surface 42 of the bottom support 16 facing upward towards the back frame 40 instead of an upper surface 44 of the bottom cushion 38 as in the seating configuration. At least a portion of the bottom surface 42 of the bottom support 16 may be a hard, durable surface capable of withstanding heavy objects being placed, stored, or pushed into the bottom surface 42 without causing damage or deformation of the bottom surface 42. For example, the bottom surface 42 of the bottom support 16 may be a hard plastic layer. The bottom surface 42 of the bottom support 16 may also be the bottom surface 42 of the bottom base 36.

In a second transition configuration, shown in FIG. 14, the back support 18 may be removed from the back frame 40 in addition to the bottom support 16 being removed from the bottom frame 26. In the second transition configuration, both the bottom frame 26 and the back frame 40 may be exposed. A modular accessory 46 may be installed on the support frame (either on the back frame 40, the bottom frame 26, or a combination of both). The modular accessory 46 may be shaped to couple to at least one anchor 28 of the support frame and be shaped to rest against the support frame.

The modular accessory 46 may be, for example, a console as shown in FIG. 15. The console may be a hollow compartment with a removable lid. The lid of the console may include at least one cup holder on an upper surface 44 of the lid. Alternatively, the modular accessory 46 may be a cooler having a double walled container with an insulating material disposed between walls of the double walled container, and a removable lid.

A car seat base 48 as shown in FIGS. 16-17 may also be installed on the bottom frame 26, with the car seat base 48 acting as a variation of the bottom base 36. The car seat base 48 may include a hard, durable surface on at least a portion of an upper surface 44 of a seat base, or alternatively, the entire car seat base 48 may be made out of a hard, durable material, capable of withstanding a child's car seat and child therein placed on car seat base 48 without causing damage or deformation of the car sear base 48. The car seat base 48 may be shaped to couple to at least one anchor 28 of the support frame. Additionally or alternatively, the car seat base 48 may be shaped to leave at least one anchor 28 of the support frame accessible so a children's car seat or booster seat can use the anchor 28 as an attachment point. The car seat base 48 may rest on or couple to the bottom frame 26 when installed. An upper surface 44 of the car seat base 48 may be shaped to be compatible with a children's car seat or booster seat.

In a stadium configuration, as shown in FIG. 19-20, the back supports 18 and bottom supports 16 of all of the rear occupant supports 14 of the vehicle 10 may be removed, as opposed at least one but not all of the supports 16, 18 of one or more rear occupant supports 14 being removed as shown in other figures. In the stadium configuration, the bottom frame 26 is rotated upwards in to a vertical position in front of the back frame 40 and substantially parallel with the back frame 40. The stadium configuration may allow for easier storage and transportation of cargo 56 or other objects in side of the passenger compartment of the vehicle 10. As discussed above, the cargo 56 may be secured to the anchors 28 or the back frame 40 or the bottom frame 26.

As shown in FIG. 21, the back frame 40 may be attached to the base structure 20, for example, the rear wall 24 of the vehicle 10, at an upper end of the back frame 40 opposite from an end of the back frame 40 closest to the floor 22. The back frame 40 may be rotatably coupled to the rear wall 24 and able to pivot a lower end of the back frame 40 away from the rear wall 24 about the attachment point into, for example, into a horizontal portion. In a second stadium configuration, shown in FIGS. 21-23, the bottom frame 26 may be stored behind the back frame 40. The back frame 40 may be rotated upwards into a horizontal position, the bottom frame 26 rotated upwards into to a vertical position behind the back frame 40 and against the rear wall 24, and the back frame 40 rotated downwards back into a vertical position.

The following numbered clauses include embodiments that are contemplated and non-limiting:

Clause 1. An occupant support for a vehicle includes a support frame including a bottom frame, a back frame, and a base structure, the back frame and the bottom frame coupled to the base structure.

Clause 2. The occupant-support for a vehicle of clause 1, any other clause, or any suitable combination of clauses, further includes a bottom support including a bottom base and a bottom cushion, the bottom cushion coupled to an upper surface of the bottom base.

Clause 3. The occupant-support for a vehicle of clause 2, any other clause, or any suitable combination of clauses, further includes a back support.

Clause 4. The occupant-support for a vehicle of clause 3, any other clause, or any suitable combination of clauses, wherein, in a seating configuration, the bottom support is coupled to the bottom frame, the bottom frame extending horizontally outwards from the back frame, and the support back is coupled to the back frame, the back frame extending vertically upwards from the bottom frame, the bottom cushion disposed upwards facing the back support.

Clause 5. The occupant-support for a vehicle of clause 4, any other clause, or any suitable combination of clauses, wherein, in a transition configuration, the bottom support is removed from the bottom frame, exposing the bottom frame.

Clause 6. The occupant-support for a vehicle of clause 5, any other clause, or any suitable combination of clauses, wherein the bottom frame comprises a first portion and a second portion, the second portion configured to nest within the first portion in the seating configuration or transition configuration.

Clause 7. The occupant-support for a vehicle of clause 6, any other clause, or any suitable combination of clauses, wherein a front side of the second portion extends forward a greater distance from the back frame in the extended configuration than a distance a front side of the bottom frame extends from the back frame in the seating configuration.

Clause 8. The occupant-support for a vehicle of clause 6, any other clause, or any suitable combination of clauses, wherein the second portion is coupled to the first portion at a side of the bottom frame opposite from the side of the bottom frame coupled to the base structure, the second portion rotatable about the first portion, the bottom frame extendable via rotating the second portion out from the first portion.

Clause 9. The occupant-support for a vehicle of clause 6, any other clause, or any suitable combination of clauses, wherein the second portion is configured to slide out of the first portion, the bottom frame extendable via sliding the second portion out of the first portion.

Clause 10. The occupant-support for a vehicle of clause 5, any other clause, or any suitable combination of clauses, wherein at least a portion of the upper surface of the bottom base is a hard, durable surface.

Clause 11. The occupant-support for a vehicle of clause 5, any other clause, or any suitable combination of clauses, wherein in a bottom base configuration, the bottom cushion is removed from the bottom base, leaving the bottom base attached to the bottom frame and exposing the upper surface of the bottom base, the upper surface of the bottom base facing the support back.

Clause 12. The occupant-support for a vehicle of clause 11, any other clause, or any suitable combination of clauses, wherein at least a portion of a bottom surface of the bottom support is a hard, durable surface.

Clause 13. The occupant-support for a vehicle of clause 5, any other clause, or any suitable combination of clauses, wherein in a flipped configuration, the bottom support is installed onto the bottom frame with the bottom surface of the bottom support is facing upward towards the back frame.

Clause 14. The occupant-support for a vehicle of clause 5, any other clause, or any suitable combination of clauses, wherein in a second transition configuration, the back support are removed from the support frame exposing both the bottom frame and the back frame.

Clause 15. The occupant-support for a vehicle of clause 14, any other clause, or any suitable combination of clauses, wherein a modular accessory is installed on the support frame.

Clause 16. The occupant-support for a vehicle of clause 5, any other clause, or any suitable combination of clauses, wherein a car seat base is installed on the bottom frame.

Clause 17. The occupant-support for a vehicle of clause 5, any other clause, or any suitable combination of clauses, wherein, in a stadium configuration, the bottom frame is rotated upwards in to a vertical position substantially parallel with the back support.

Clause 18. The occupant-support for a vehicle of clause 5, any other clause, or any suitable combination of clauses, wherein the back frame is rotatably coupled to the base structure.

Clause 19. The occupant-support for a vehicle of clause 5, any other clause, or any suitable combination of clauses, wherein, in a second stadium configuration, the bottom frame is rotated upwards in to a vertical position behind the back frame, substantially parallel with the back frame and disposed between the back frame and the base structure.

Clause 20. A vehicle includes a vehicle frame including a floor, a front occupant support, and a rear wall to define a rear passenger compartment in front of the rear wall, rear of the front occupant support, and above the floor.

Clause 21. The vehicle of clause 20, any other clause, or any suitable combination of clauses, further includes a rear occupant support positioned directly forward of the rear wall and between the front occupant support and the rear wall within the passenger compartment, the rear occupant support including a bottom frame coupled to the floor, a back frame coupled to the rear wall, a bottom support comprising a bottom base and a bottom cushion coupled to an upper surface of the bottom base, and a back support coupled.

Clause 22. The vehicle of clause 21, any other clause, or any suitable combination of clauses, wherein, in a seating configuration, the bottom support is coupled to the bottom frame, the bottom frame extending horizontally outwards from the back frame and parallel to the floor, and the support back is coupled to the back frame, the back frame extending vertically upwards from the bottom frame, the bottom cushion disposed upwards facing the back support, Clause 23. The vehicle of clause 22, any other clause, or any suitable combination of clauses, wherein, in a transition configuration, the bottom support is removed from the bottom frame, exposing the bottom frame.

Clause 24. The vehicle of clause 23, any other clause, or any suitable combination of clauses, wherein the bottom frame comprises a first portion and a second portion, the second portion configured to nest within the first portion in the seating configuration or the transition configuration.

Clause 25. The vehicle of clause 24, any other clause, or any suitable combination of clauses, wherein a front side of the second portion is closer to a rear surface of the front occupant support in the extended configuration than a front side of the bottom frame is to the rear surface of the front occupant support in the seating configuration.

Clause 26. The vehicle of clause 23, any other clause, or any suitable combination of clauses, wherein the back frame is rotatably coupled to the rear wall.

Clause 27. The vehicle of clause 23, any other clause, or any suitable combination of clauses, wherein, in a cargo configuration, the bottom frame is rotated upwards in to a vertical position behind the back frame, substantially parallel with the back frame and rear wall and disposed between the back frame and the rear wall.

The invention claimed is:

1. An occupant support for a vehicle, the occupant support comprising a support frame including a bottom frame, a back frame, and a base structure, the back frame and the bottom frame coupled to the base structure;

a bottom support including a bottom base and a bottom cushion, the bottom cushion coupled to an upper surface of the bottom base; and a back support, wherein, in a seating configuration, the bottom support is coupled to the bottom frame, the bottom frame extending horizontally outwards from the back frame, and the back support is coupled to the back frame, the back frame extending vertically upwards from the bottom frame, the bottom cushion disposed upwards facing the back support, wherein, in a transition configuration, the bottom support is removed from the bottom frame, exposing the bottom frame.

2. The occupant support of claim 1, wherein the bottom frame comprises a first portion and a second portion, the second portion configured to nest within the first portion in the seating configuration or the transition configuration.

3. The occupant support of claim 2, wherein a distance of a front side of the bottom frame extending forward from the back frame in the seating configuration is smaller than a distance of a front side of the second portion extending forward from the back frame in an extended configuration.

4. The occupant support of claim 3, wherein the second portion is coupled to the first portion at a side of the bottom frame opposite from the side of the bottom frame coupled to the base structure, the second portion rotatable about the first portion, the bottom frame extendable via rotating the second portion out from the first portion.

5. The occupant support of claim 3, wherein the second portion is configured to slide out of the first portion, the bottom frame extendable via sliding the second portion out of the first portion.

6. The occupant support of claim 1, wherein at least a portion of the upper surface of the bottom base is a hard, durable surface.

7. The occupant support of claim 1, wherein in a bottom base configuration, the bottom cushion is removed from the bottom base, leaving the bottom base attached to the bottom frame and exposing the upper surface of the bottom base, the upper surface of the bottom base facing the back support.

8. The occupant support of claim 1, wherein in a flipped configuration, the bottom support is installed onto the bottom frame with a bottom surface of the bottom support is facing upward towards the back frame.

9. The occupant support of claim 8, wherein at least a portion of the bottom surface of the bottom support is a hard, durable surface.

10. The occupant support of claim 1, wherein in a second transition configuration, the back support is removed from the support frame exposing both the bottom frame and the back frame.

11. The occupant support of claim 10, wherein a modular accessory is installed on the support frame.

12. The occupant support of claim 1, wherein a car seat base is installed on the bottom frame.

13. The occupant support of claim 1, wherein, in a stadium configuration, the bottom frame is rotated upwards in to a vertical position substantially parallel with the back frame.

14. The occupant support of claim 1, wherein the back frame is rotatably coupled to the base structure.

15. The occupant support of claim 1, wherein, in a second stadium configuration, the bottom frame is rotated upwards in to a vertical position behind the back frame, substantially parallel with the back frame and disposed between the back frame and the base structure.

16. A vehicle comprising a vehicle frame including a floor, a front occupant support, and a rear wall to define a rear passenger compartment in front of the rear wall, rear of the front occupant support, and above the floor; and a rear occupant support positioned directly forward of the rear wall and between the front occupant support and the rear wall within the passenger compartment, the rear occupant support including a bottom frame, a back frame coupled to the rear wall, a bottom support comprising a bottom base and a bottom cushion coupled to an upper surface of the bottom base, and a back support coupled to the back frame, wherein, in a seating configuration, the bottom support is coupled to the bottom frame, the bottom frame extending horizontally outwards from the back frame and parallel to the floor, and the back support is coupled to the back frame, the back frame extending vertically upwards from the bottom frame, the bottom cushion disposed upwards facing the back support, wherein, in a transition configuration, the bottom support is removed from the bottom frame, exposing the bottom frame.

17. The vehicle of claim 16, wherein the bottom frame comprises a first portion and a second portion, the second portion configured to nest within the first portion in the seating configuration or the transition configuration.

18. The vehicle of claim 17, wherein a front side of the second portion is closer to a rear surface of the front occupant support in an extended configuration than a front side of the bottom frame is to the rear surface of the front occupant support in the seating configuration.

19. The vehicle of claim 16, wherein the back frame is rotatably coupled to the rear wall and the bottom frame is rotatably coupled to the floor.

20. The vehicle of claim 16, wherein, in a cargo configuration, the bottom frame is rotated upwards in to a vertical position behind the back frame, substantially parallel with the back frame and the rear wall and disposed between the back frame and the rear wall.

* * * * *